SULFUR VAPORIZATION

Original Filed April 21, 1945 2 Sheets-Sheet 1

INVENTORS
Charles A. Porter
Milton M. Marisic
BY Edward H. Sang
ATTORNEY

SULFUR VAPORIZATION

Original Filed April 21, 1945 2 Sheets-Sheet 2

INVENTORS
Charles A. Porter
Milton M. Marisic
BY Edward H. Seng
ATTORNEY

Reissued Jan. 2, 1951

Re. 23,318

UNITED STATES PATENT OFFICE 23,318

SULFUR VAPORIZATION

Charles A. Porter, Crystal Lake, and Milton M. Marisic, Elgin, Ill., assignors to The Pure Oil Company, Chicago, Ill., a corporation of Ohio Original No. 2,508,292, dated May 16, 1950, Serial No. 589,679, April 21, 1945. Application for reissue August 10, 1950, Serial No. 178,732

13 Claims. (Cl. 23—224)

Matter enclosed in heavy brackets [ ] appears in the original patent but forms no part of this reissue specification; matter printed in italics indicates the additions made by reissue

This invention relates to method and apparatus for vaporizing and superheating sulfur.

Vaporization of sulfur and superheating of sulfur vapors are two of the most difficult problems encountered in chemical operations. Sulfur ordinarily contains a small amount of both organic and inorganic impurities which deposit on the vaporizing surfaces when sulfur is vaporized causing formation of coke and scale deposits which necessitate frequent cleaning of the still in order to obtain satisfactory heat transfer rates without exceeding safe metal temperatures. In superheating sulfur vapors the principal difficulty is encountered in the corrosive effect of sulfur on all common metals and alloys at elevated temperature. Not only is the life of the heating element shortened, but scale formation on the surface of the heating elements greatly reduces the heating transfer rates. Many chemical syntheses involving use of sulfur would be possible if a satisfactory method and apparatus for vaporizing and superheating sulfur was available.

An object of this invention is to provide an apparatus for vaporizing sulfur.

A further object of the invention is to provide a method and apparatus for superheating sulfur vapors without any substantial corrosion of the apparatus.

Figure 1:
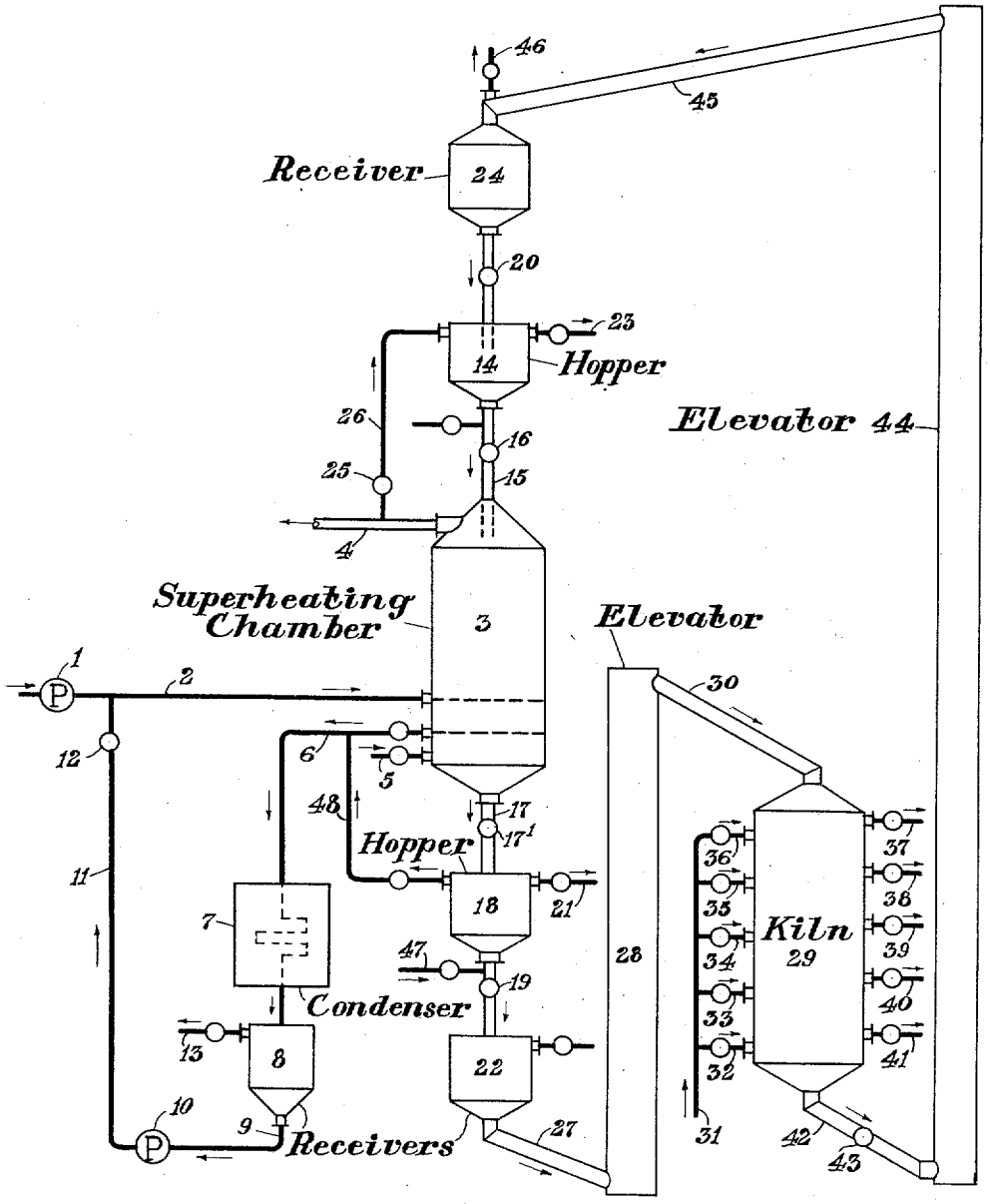
Figure 2:
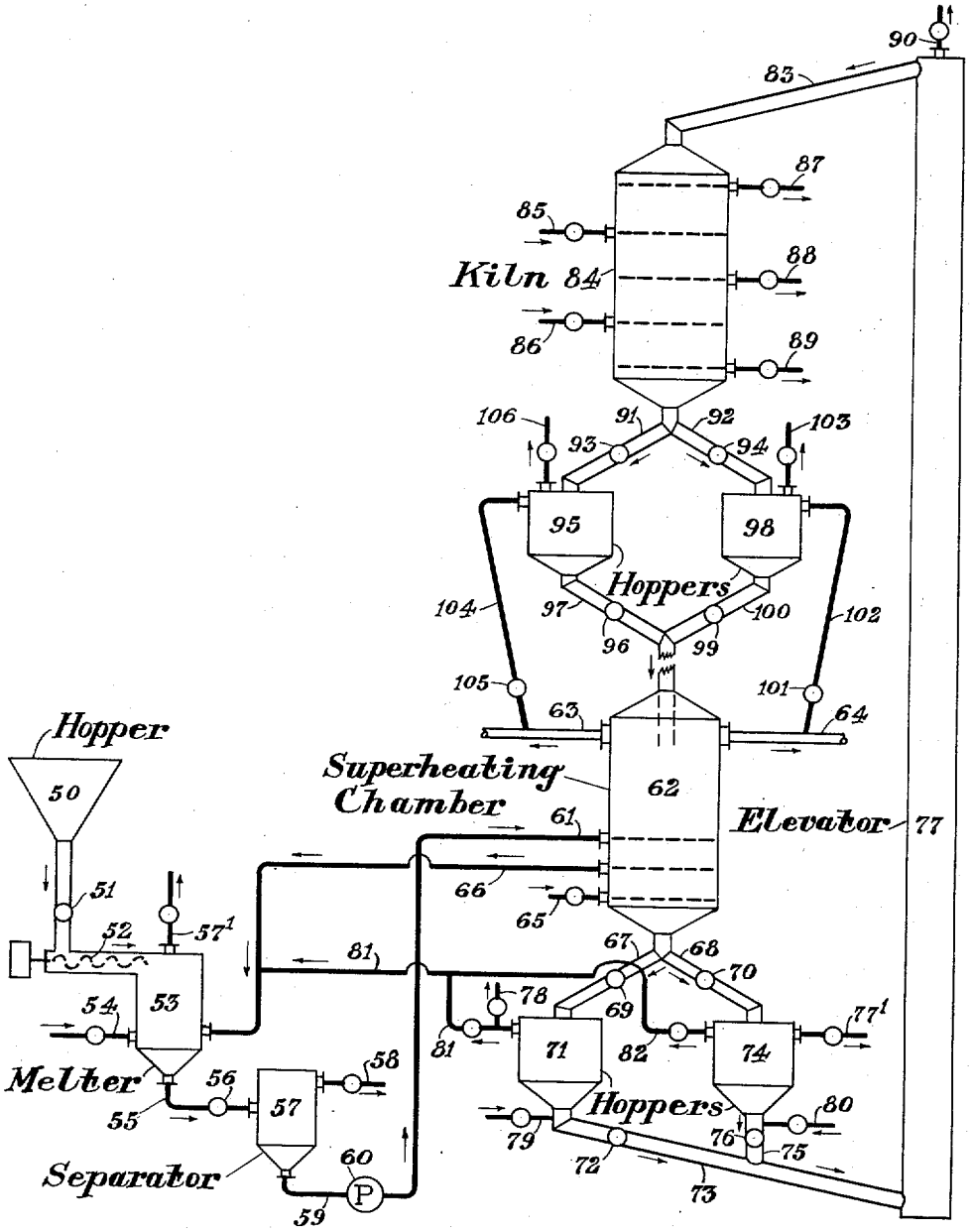

Further objects of this invention will manifest themselves from the following description and the accompanying drawings, of which Figure 1 is a diagrammatic elevational view of one form of apparatus for carrying out the invention; and Figure 2 a diagrammatic elevational view of another form of apparatus for carrying out the invention.

Referring to Figure 1, the numeral 1 designates a pump by means of which molten sulfur at a temperature between approximately 250° and 300° F. is pumped through line 2 into vaporizing and superheating column or chamber 3. Column 3 is lined with refractory material such as carborundum, alundum, quartz, fire brick, or the like, which is not attacked by sulfur to any substantial extent. Column 3 is filled with a bed of pelleted, fragmentary or granular refractory material such as carborundum, alundum, quartz or fire brick, heated to a temperature somewhat above the temperature to which it is desired to superheat sulfur vapors. Upon contact of the molten sulfur with the moving bed of refractory material the sulfur is vaporized and passes upward through the bed in direct heat exchange with the hot refractory material and becomes heated to the desired temperature. The superheated sulfur vapors leave the top of chamber 3 through line 4 and are charged to a system in which it is desired to use the superheated sulfur vapors, such as for example a reactor for making carbon disulfide by reaction of superheated sulfur vapors with methane, or other hydrocarbon gases, in the presence of a suitable catalyst such as silica gel, activated alumina, activated clay or synthetic silica-alumina catalyst. The molten sulfur enters the chamber 3 preferably some distance from the bottom thereof, but below the middle of the column.

Superheated steam is admitted to the bottom of the column 3 through valve-controlled pipe 5 at a temperature of approximately 900°–950° F. in order to purge residual sulfur from the refractory material. An outlet 6 is provided between the line 5 and line 2 for drawing off the steam and sulfur vapors contained therein from the purged refractory material. The line 6 is connected to a condenser 7 maintained under atmospheric or superatmospheric pressure. Water, steam and sulfur in molten form pass from the condenser 7 to the receiver 8. Sufficient pressure may be maintained in the condenser and receiver 8 so that substantially all the steam and sulfur is condensed to liquid or molten state. Pressure in the column 3 will be somewhat above that maintained in the condenser 7 so that the purging steam and sulfur vapors contained therein will pass through line 6 instead of passing upward through the column 3 to the outlet 4. It will be understood, of course, that a certain portion of the purging steam will pass upward through column 3 and be eliminated through line 4. From the receiver 8 molten sulfur is recycled through line 9 by means of pump 10 through line 11 controlled by valve 12 to line 2. Hot water and steam are withdrawn from the upper portion of receiver 8 through valve-controlled line 13.

Hot refractory material is intermittently introduced into the vaporizer and superheater 3 from hopper 14 through line 15 controlled by valve 16. The refractory material is intermittently withdrawn from the bottom of column 3 through line 17 controlled by valve 17′ and passes to hopper 18. At such time as hopper 14 is being emptied into column 3, valve 19 in the outlet of hopper 18 and valve 20 in the inlet to hopper 14 are closed. Refractory material is preferably withdrawn from column 3 into hopper 18 at the same time as hopper 14 is emptied in column 3. When hopper 14 is empty and hopper 18 is full of refractory material valve 16 in the outlet of hopper 14 and valve 17′ in the inlet to hopper 18 are closed and the flow of refractory material in the chamber 3 is interrupted. Any steam which accumulates in the hopper 18 is removed from the top thereof through valve-controlled line 21 after which refractory material from hopper 18 is discharged therefrom through valve 19 and the refractory material passes into receiver 22.

During the time that steam is withdrawn from the hopper 18 hopper 14 is depressured and sulfur is withdrawn therefrom through valve-controlled line 23. The sulfur vapors may be condensed and recycled to line 2 through a line not shown. Valve 20 is then opened and hopper 14 is then recharged with hot refractory material from receiver 24 through valve 20. As soon as hopper 14 is filled with hot refractory material valve 20 is closed and any flue gas which may have accumulated in hopper 14 is exhausted therefrom through valve-controlled line 23. Hopper 14 is then pressured with sulfur vapors from line 4 by opening valve 25 in line 26 and permitting sulfur vapors to flow into the hopper 14. When the pressure between chamber 3 and hopper 14 has been equalized valve 16 is again opened and the refractory material is permitted to flow from the hopper 14 into top of chamber 3 and valve 17' is opened to permit refractory material to be withdrawn from the bottom of chamber 3.

From the receiver 22 granular refractory material passes continuously through line 27 to elevator 28, which may be of the bucket, or any other suitable type, and is conveyed to kiln 29 through line 30. The refractory material passes downwardly through kiln 29 and is heated during its downward passage to the desired temperature by burning in the kiln combustible gases mixed with air charged thereto through manifold 31 and valve-control ed lines 32, 33, 34, 35, and 36 at spaced points along the kiln. Any suitable liquid, powdered or gaseous fuel may be burned in the kiln 29 such as natural or producer gas, furnace oil, acid sludge, or tar. A portion of the heat may be supplied by combustion of organic matter deposited on the refractory material during the sulfur vaporization step. Some crude sulfurs contain substantial amounts of organic matter which is removed during the vaporization and superheating step and left deposited in the form of coke on the refractory material. This organic matter is burned from the refractory material in kiln 29 by supplying sufficient excess of air to burn the organic matter.

Flue gases leave the kiln 29 through valve-controlled lines 37, 38, 39, 40 and 41. The heated refractory material leaves the bottom of the kiln through line 42 controlled by valve 43 and is carried by elevator 44 to line 45 which empties into the top of receiver 24. Any residual flue gas in the heated refractory material is withdrawn from receiver 24 through valve-controlled line 46.

In the apparatus just described, in addition to the vaporizing and superheating chamber 3, hoppers 14 and 18 are preferably lined with refractory material, as well as such other portions of the apparatus which come in direct contact with sulfur vapors at high temperature.

Instead of purging the refractory material by injecting superheated steam through line 5 into the bottom of chamber 3 and withdrawing the steam and contained sulfur vapor through line 6, the refractory material may be purged in hopper 18 by injecting superheated steam into the bottom thereof through valve-controlled line 47 and withdrawing the steam with its sulfur content from the top of hopper 18 through valve-controlled line 48 which, in turn connects to line 6.

It will be apparent that the apparatus shown in Figure 1 may be used to purify contaminated sulfur. In such case the refractory material will be heated to a temperature sufficient only to vaporize the sulfur. Such temperature may be approximately 1000° to 1100° F.

Referring now to Figure 2, solid sulfur in small pieces or in powdered state is fed from hopper 50 through valve 51 by means of screw conveyor to a sulfur melter 53. The sulfur is melted in melter 53 by direct contact with superheated steam or hot water under pressure. Sulfur is charged to the melter 53 intermittently. When the melter is filled with sulfur, valve 51 is closed and superheated steam is introduced into the bottom of melter 53 through valve controlled line 54. Melted sulfur and water are transferred from the bottom of melter 53 through line 55 controlled by valve 56 to a sulfur-water separator 57. Valve 56 is then closed and melter 53 depressured by opening valve on line 57' on the top of the melter to permit steam to escape and is then recharged by opening valve 51 and operating screw conveyer 52. Since melter 53 is operated intermittently it should be made sufficiently large to provide a sufficient supply of molten sulfur for separator 57 so as to enable sulfur vaporizing and superheating operation to be carried on continuously.

Water is removed from the top of separator 57 through valve-controllel line 58. Molten sulfur at a temperature of approximately 250–275° F. is withdrawn from the bottom of separator 57 through line 59 by means of pump 60 and pumped through line 61 into vaporizer and superheater chamber 62 at a point below the middle thereof, but some distance from the bottom thereof. Molten sulfur is discharged into chamber 62 through a suitable distributing device and contacts a hot moving bed of pelleted, granular or fragmentary refractory material which vaporizes the sulfur and superheats it to the desired temperature. The superheated sulfur vapor leaves the top of chamber 62 through lines 63 and 64.

Superheated steam at a temperature of approximately 900°–950° F. is introduced into the bottom of vaporizing and superheating chamber 62 through valve-controlled line 65 to purge the refractory material of sulfur. The sulfur vapor and steam leave the chamber 62 through line 66 and are returned to sulfur melter 53. The sulfur condenses in melter 53 and the steam wholly or partially condenses to water at the same time as the solid sulfur is heated to the melting point. Only sufficient superheated steam is admitted to the melter 53 through line 54 to supply heat in addition to that supplied through line 66 necessary for melting sulfur in melter 53.

Refractory material leaves the bottom of chamber 62 through either lines 67 or 68 controlled by valves 69 and 70, respectively. If valve 70 is closed and valve 69 is open the refractory material will pass into hopper 71. While refractory material is passing into hopper 71, valve 72 in the outlet 73 connected to the bottom of hopper 71 is closed. While refractory material is flowing from chamber 62 into hopper 71, refractory material is flowing from hopper 74 through line 75 controlled by valve 76 to the bottom of elevator 77. Elevator 77 is of the bucket, or any other suitable type.

After hopper 74 is emptied, valve 76 is closed and valve 70 is opened to permit the refractory material to pass from the bottom of chamber 62 through line 68 into hopper 74. As soon as hopper 74 is full of refractory material, valve 70 is closed and any steam accumulated in hopper 74 is withdrawn through valve-controlled pipe 77'.

After hopper 71 is filled with refractory material, valve 69 is closed and the hopper is depressured by drawing off steam through valve-controlled line 78. Valve 72 is then opened and the refractory material passes from hopper 71 through line 73 to the elevator 77. In this way refractory material is continuously withdrawn from chamber 62 through either hopper 71 or hopper 74 and supplied continuously to the elevator 77.

Instead of purging sulfur from the refractory material by admitting superheated steam into the bottom of chamber 62, sulfur may be purged from the refractory material in hoppers 71 and 74 by admitting superheated steam into the bottom thereof through valve-controlled lines 79 and 80, respectively, and withdrawing the steam and sulfur vapors from the top of hoppers 71 and 74 through valve-controlled lines 81 and 82, respectively. From the line 81 the steam and sulfur vapors pass to line 66 and then to sulfur melter 53.

Refractory material is charged from the top of the elevator 77 through line 83 to kiln 84. Kiln 84 is heated by means of a mixture of air and combustible gas, liquid or powdered fuel introduced at spaced points through valve-controlled lines 85 and 86. Combustion gases are withdrawn from the kiln through valve-controlled lines 87, 88 and 89. If desired, combustion gases from the kiln may be circulated through the elevator 77 and withdrawn from the top thereof through valve-controlled line 90 in order to preheat the refractory material before it is introduced into the top of the kiln. If for example, the refractory material is heated to approximately 1400° F. in the kiln, it may be preheated to approximately 1200° F. in the elevator by circulating the flue gases therethrough. Heater refractory material leaves the bottom of the kiln 84 through either lines 91 or 92 controlled by valves 93 and 94, respectively. When refractory material is discharged from the kiln through line 91 into hopper 95, valve 96 in the outlet 97 of hopper 95 will be closed. Valve 94 in the inlet 92 to hopper 98 will be closed, and valves 99 in the outlet 100 of hopper 98 will open so that refractory material can flow from hopper 98 continuously into the top of the vaporizer and superheater 62. As soon as hopper 98 is empty, valve 99 and valve 101 in line 102 are closed and sulfur vapors are exhausted from the hopper through valve-controlled line 103. Sulfur vapors exhausted through line 103 may be recycled before or after condensation to separator 57 by means of a line not shown. After hopper 98 is depressured valve 94 is opened to permit hot refractory material to flow from kiln 84 into the hopper.

Hopper 95 is filled with hot refractory material during the period that refractory material is fed from hopper 98 into the chamber 62. After hopper 95 is filled, valve 93 is closed and hopper 95 is pressured with sulfur vapors through line 104, controlled by valve 105, connected to line 63. Hopper 95 is now ready to feed hot refractory material to chamber 62 by opening valve 96. Hopper 95 is exhausted of sulfur vapor through valve-controlled line 106 when it is empty and the sulfur vapors may be recycled to separator 57. Hopper 98 is pressured by admitting sulfur vapors thereto through line 102 controlled by valve 101 after it is filled and valve 94 has been closed.

Flue gas may be removed from the refractory material in hoppers 95 and 98 through valve-controlled lines 106 and 103, respectively, prior to repressuring with sulfur vapors.

It will be understood in connection with Figure 1 that the purging steam with contained sulfur vapors may be used to melt solid sulfur, as described in connection with Figure 2, and that sulfur melting in Figure 2 by means of the purging steam may be omitted and sulfur melted by extraneous heating means only.

The method and apparatus described and shown in connection with Figure 2 have the advantage over those described and shown in Figure 1, in that in Figure 1 the temperature to which the refractory material can be heated is limited by the ability of the metal of which the elevator is constructed to withstand high temperatures. At the present time, materials available for such construction are capable of standing a maximum temperature of about 1200° F. with the result that the limit to which the refractory material can be heated is about 1200° F. and the temperature to which sulfur can be heated by means of the refractory material is somewhat below 1200° F.

The apparatus of Figure 2 is not limited as to temperature because the heating kiln follows the elevator. Therefore, much higher sulfur vapor temperatures can be attained in conjunction with the construction shown in Figure 2.

In both Figures 1 and 2 all parts which come in contact with hot sulfur vapors are preferably made of or lined with refractory material which is not substantially attacked by sulfur.

In both Figures 1 and 2 the flow rate of refractory material through the vaporizing and superheating chamber, and the quantity of sulfur charged is so regulated that the temperature of the refractory material leaving the bottom of the chamber is above the vaporizing temperature of sulfur at existing pressure.

As an example of an operation carried out in the apparatus shown in Figure 2, alundum, as the refractor, in the form of 6 to 10 mesh size fragments is heated to 1400° F. in the kiln 84 by the combustion of natural gas. The granular alundum moves continuously through the kiln and passes to either hopper 95 or 98 and therefrom as previously explained through chamber 62. Molten sulfur at a temperature of 270° F. is pumped continuously through line 61 to chamber 62 wherein on contacting the moving granular alundum it is vaporized and superheated to 1200° F. before leaving chamber 62 through lines 63 and 64. Molten sulfur is charged to 62 at the rate of 24.7 pounds of sulfur per hour and granular alundum passes through chamber 62 at the rate of 1 cubic foot per hour. Steam at 900° F. is introduced into chamber 62 through line 65. This steam amounts to about 3% by weight of the sulfur charged to chamber 62. The temperature of the alundum particles leaving through the bottom of 62 is 900° F.

*The word "granular" employed in the following claims is intended to connote not only irregularly shaped, particulated or discrete refractory materials, such as fragmented or granular solids, but also divided, artificially shaped solids having regular geometrical configurations, such as pelleted material.*

It is claimed:

1. The method of vaporizing sulfur comprising circulating solid [comminuted] *granular* material resistant to sulfur attack through a heater and vaporizer, heating said material, to a temperature above the boiling point of sulfur in said heater by direct contact with hot combustion gases, removing combustion gases from the treated material, charging the hot material to a vaporizing zone, charging sulfur to be vaporized to said vaporizing zone in direct contact with said hot material, withdrawing sulfur vapors from said vaporizing zone, withdrawing said material from the vaporizing zone before the temperature of the material falls below the boiling point of sulfur, recycling the withdrawn material to the heater and purging sulfur from said material prior to recycling it to the heater.

2. Method in accordance with claim 1 in which said material passes through the heater and vaporizer in the form of a moving bed.

3. Method in accordance with claim 1 in which said material passes continuously through the heater and vaporizing zone in the form of a moving bed.

4. Method in accordance with claim 1 in which the [comminuted] *granular* material is mechanically conveyed from the heater to the vaporizing zone.

5. Method in accordance with claim 1 in which the [comminuted] *granular* material is mechanically conveyed from the vaporizing zone to the heater and is caused to flow by gravity from the heater to the vaporizing zone.

6. The method of vaporizing sulfur comprising heating [comminuted] *granular* refractory material to a temperature above the boiling point of sulfur by direct contact with hot combustion gas, separating combustion gas from the hot refractory material, charging said hot refractory material to a vaporizing zone lined with refractory material, charging molten sulfur to said vaporizing zone in direct contact with said hot refractory material, contacting said sulfur and refractory material for a period of time sufficient to vaporize the sulfur and superheat the vapors, withdrawing superheated sulfur vapors from the vaporizing zone withdrawing said [comminuted] *granular* refractory material from said vaporizing zone at such rate as to remove it from said zone before its temperature drops below the boiling point of sulfur, recycling the withdrawn refractory material to the heater and purging sulfur from said refractory material prior to recycling it to the heater.

7. Method in accordance with claim 6 in which superheated steam is used to purge sulfur from the refractory material and the resulting steam-sulfur vapor mixture is used to melt sulfur to be charged to the vaporizer.

8. Method in accordance with claim 6 in which the [comminuted] *granular* refractory material is heated to approximately 1200° F. before charging it to the vaporizing zone.

9. Method in accordance with claim 6 in which the [comminuted] *granular* refractory material is heated to approximately 1400° F. prior to charging it to the vaporizing zone.

10. The method of vaporizing sulfur comprising, alternately heating [comminuted] *granular* solid material not reactive with sulfur at temperatures of boiling sulfur to a temperature substantially above the boiling point of sulfur and contacting said heated material with sulfur to be vaporized, discontinuing contact of sulfur with said solid material before the temperature thereof is reduced below the boiling temperature of sulfur, purging residual sulfur from the solid material and repeating the heating of the solid material and the vaporization of sulfur therewith.

11. The method of vaporizing sulfur comprising, circulating [comminuted] *granular* solid material not reactable with sulfur at temperatures of boiling sulfur through a heating and vaporizing zone, heating said material in said heating zone to a temperature substantially above the boiling point of sulfur, passing said heated material to said vaporizing zone and there contacting with sulfur to be vaporized, withdrawing sulfur vapors from said vaporizing zone, withdrawing said material from said vaporizing zone before the temperature thereof is reduced below the boiling temperature of sulfur, purging residual sulfur therefrom and recycling said material to said heating zone.

12. The method in accordance with claim 11 in which the solid material is a refractory material.

13. The method in accordance with claim 11 in which the sulfur is contacted with a hot material in a moving bed of the material.

CHARLES A. PORTER.
MILTON M. MARISIC.

REFERENCES CITED

The following references are of record in the file of this patent or the original patent:

UNITED STATES PATENTS

| Number | Name | Date |
|---|---|---|
| 91,313 | Divine | June 15, 1889 |
| 873,812 | Walter | Dec. 17, 1907 |
| 1,712,082 | Koppers | May 7, 1929 |
| 1,738,890 | Goodrich | Dec. 10, 1929 |
| 2,030,885 | Maxim | Feb. 18, 1936 |
| 2,113,230 | Ceccon | Apr. 5, 1938 |
| 2,348,699 | Tuhle | May 9, 1944 |